United States Patent [19]

Reese

[11] 4,141,709
[45] Feb. 27, 1979

[54] BUSHING ENVIRONMENTAL CONTROL

[75] Inventor: Walter J. Reese, North Huntington, Pa.

[73] Assignee: PPG Industries, Inc., Pittsburgh, Pa.

[21] Appl. No.: 886,489

[22] Filed: Mar. 14, 1978

[51] Int. Cl.² ............................................. C03B 37/02
[52] U.S. Cl. ................................................ 65/2; 65/12
[58] Field of Search .......................... 65/1, 2, 11 W, 12

[56] References Cited

U.S. PATENT DOCUMENTS

| 2,280,388 | 4/1942 | Drill | 299/140 |
|---|---|---|---|
| 2,707,690 | 5/1955 | Pearson | 117/104 |
| 2,931,422 | 4/1960 | Long | 154/29 |
| 3,468,644 | 9/1969 | Leaman | 65/12 |
| 3,695,858 | 10/1972 | Russell | 65/2 |
| 3,775,074 | 11/1973 | Russell | 65/2 |
| 3,846,097 | 11/1974 | Russell | 65/2 |
| 3,982,915 | 9/1976 | Coggin | 65/1 |
| 3,986,853 | 10/1976 | Coggin et al. | 65/2 |
| 4,033,742 | 7/1977 | Nichols | 65/2 |
| 4,049,415 | 9/1977 | Dent | 65/12 X |

Primary Examiner—Robert L. Lindsay, Jr.
Attorney, Agent, or Firm—Paul A. Leipold; Alan T. McDonald

[57] ABSTRACT

A method is disclosed for controlling the environment below a glass fiber forming bushing. A fog or mist is created below the bushing by forming an air vortex in front of the bushing which carries water or another liquid cooling fluid upwardly towards the bushing. The cooling liquid is misted or fogged below the bushing. This mist or fog absorbs heat from the bushing and the apparatus in the region below the bushing and helps cool the environment below the bushing. In addition, this mist of cooling fluid acts as a radiation shield to reduce the amount of heat radiated from the bushing and other apparatus toward the operator of the forming position and thus aids in his comfort.

12 Claims, 5 Drawing Figures

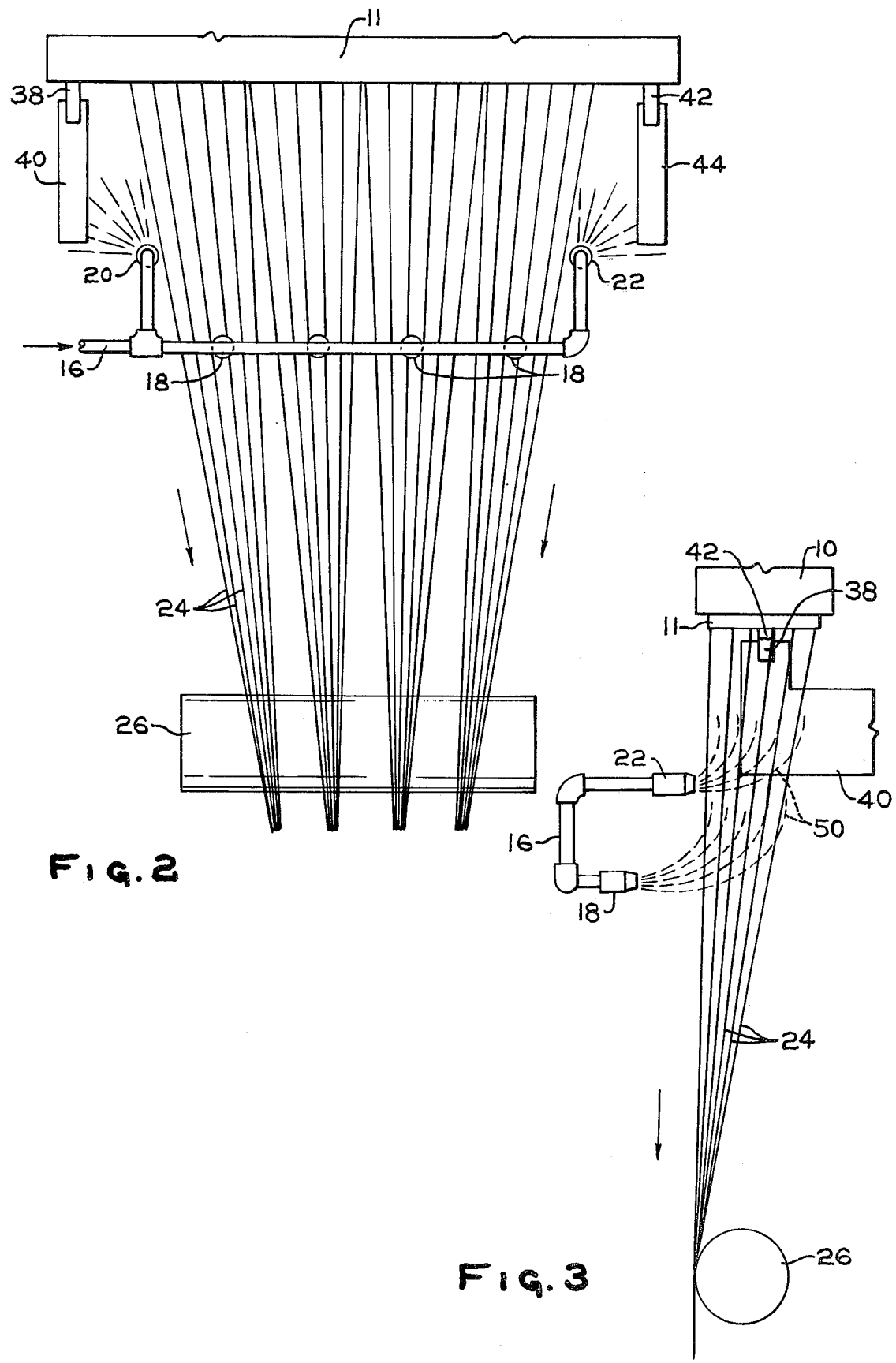

BUSHING ENVIRONMENTAL CONTROL

BACKGROUND OF THE INVENTION

Glass fiber strand is typically formed by attenuating filaments through bushing tips located at the bottom of a heated bushing containing molten glass. Often, the filaments are sprayed with water or other cooling fluid as they emerge from the bushing to quench them. The filaments are then passed over the application surface of an applicator where they are coated with a binder and/or size. After leaving the applicator surface, the filaments are then gathered into a unified strand in a gathering means, such as a gathering shoe, which is normally a grooved wheel or cylinder which is formed of a material which is not easily abraded by the filaments, such as graphite or brass. In some instances, the application and gathering steps are combined into a single operation, as in pad applicators.

The strand leaving the gathering means can then be handled in any of numerous ways. Often, the strand is passed across the face of a rotating spiral and is traversed by the spiral and collected on a rotating drum or collet as a forming package. In another operation, the strand is carried across the face of the rotating collet by means of a traversing guide eye. These two operations normally form either a generally barrel-shaped or cylindrical forming package.

Continuous strands can also be collected in a container. In this operation, the strand is passed between rotating wheels or belts or a combination of wheels and belts and is attenuated into a container. Glass strand may also be chopped between a wheel having a plurality of blades on the periphery thereof and a back-up wheel as it emerges from the gathering means and collected in a container or a chopped strand.

In the above operations, the collet, the belt and/or wheel attenuator or the chopper provides the necessary attenuative forces on the strand to attenuate the strands and the filaments associated therewith through the bushing.

One of the problems encountered in forming glass strand is control of the thermal environment below the bushing. The ability to form high quality glass filaments successfully relies, in large measure, on the control of the viscosity of the glass. Glass viscosity varies inversely with temperature, i.e. increases in temperature decrease the viscosity of the glass and vice versa. Only within small ranges of glass viscosity can glass filaments with consistent diameters be formed successfully.

As careful viscosity control of the glass is imperative, careful control of the thermal environment at and below the bushing is extremely important to control this viscosity. For the most part, bushing temperature control is maintained by regulating electrical energy input to the bushing, based upon temperature measurements of the bushing. However, while such control may regulate the temperature of the bushing itself, this control does not alone successfully regulate temperature in the fiber forming region below the bushing. Often, variations in temperature across the width and along the length of the bushing and below it are realized, due to the bushing tip pattern, airflow variations, and the like. A primary purpose of the present invention is to improve the environment of the fiber forming region below the bushing in a glass strand forming operation.

As previously mentioned, in the formation of glass strand it is often desired to quench the filaments immediately after they are formed by spraying them with water or other cooling fluid prior to their arrival at the application surface. Not only does this make for easier handling of the hot filaments by the operator, but it also aids in the solidification of the filaments and thus reduces changes of the filaments breaking as they are attenuated. While liquid cooling fluids have been used in the past to cool the filaments as they emerge from the bushing, no use has been made of liquid cooling fluids to aid in controlling the bushing environment. It is thus another purpose of the instant invention to make use of cooling fluids normally present in a glass fiber forming operation to assist in controlling the bushing environment.

It is also an object of the instant invention to provide cooling to various apparatus elements present in the fiber forming region below the bushing.

It is also an object of the instant invention to create a radiation shield encompassing the fiber forming region below the bushing to absorb radiant heat from this region and thus substantially reduce transfer of this heat from the fiber forming region to the environment immediately below the bushing, thus improving the comfort of the operator in the fiber forming position.

THE PRESENT INVENTION

By means of the present invention, the above-mentioned objects are obtained. The present invention involves controlling the environment below a glass fiber forming bushing by creating a vortex of air in front of the bushing, flowing a liquid cooling fluid across the filaments and carrying the cooling fluid upwardly towards the bushing by means of the air vortex to thereby create a mist or fog of liquid cooling fluid in the region immediately below the bushing.

This mist or fog is propelled upwardly towards the bushing due to the air currents caused by the vortex in front of the bushing. The vortex draws air outwardly from below the bushing and between a pair of cooling panels which are positioned to create the air vortex. To provide this air current, air is drawn upwardly toward the bushing. The air that is drawn upwardly entraps and transports the spray liquid which is applied to the filaments and carries the liquid cooling fluid with it.

Additionally, liquid sprays may be employed to spray liquid cooling fluid on the sides of the filament fan and against the terminal clamps connected to the bushing to cool these elements. This helps create side cooling to the filament forming region and aids in maintaining a more uniform thermal environment below the bushing.

The liquid spray in the filament forming region, due in part to the heat in the region and in part from the nozzle through which the cooling liquid is released, forms a mist or fog. This mist or fog absorbs heat from the bushing and the thermal clamps used to supply electrical energy to the bushing and thus cools the region in a uniform manner. Additionally, this mist or fog acts as a radiation shield for the forming position operator. Thus, a substantial portion of the heat normally radiated toward the operator is absorbed by the fog or mist of liquid created and does not reach the operator. This increases the comfort of the operator while working at the forming position.

In a typical glass fiber forming operation, cooling fluid is passed in a generally horizontal pattern across and in contact with the filaments as they are formed to cool and harden them. When the system of the present invention is employed, part of this cooling fluid is lifted vertically by the updraft of air caused by the vortex or whirlpool which is created in front of the bushing. Much of the cooling fluid remains in the fiber forming region immediately below the bushing, causing a supersaturated environment of the mist or fog in this region, i.e., a relative humidity in excess of 100%. Some of the cooling fluid is vaporized by the heat of the bushing and its adjacent equipment, adding to the cooling of this region. Optionally, certain of the spray nozzles may be adjusted to spray cooling fluid directly on apparatus within the fiber forming region to cool them and/or to spray cooling fluid along the sides of the filaments fan to aid in the cooling of this portion of the fiber forming region.

In other words, cooling air constantly is passed horizontally and downwardly toward the bushing. A portion of this air is continuously directed toward the bushing at a position below the bushing at a velocity sufficient to entrap a portion of the liquid cooling fluid. This causes a supersaturated flow of air to move vertically toward the bushing and to thereby create a supersaturated air atmosphere immediately below the bushing. This supersaturated air is continuously passed to this area below the bushing and thus continuously removes heat from the bushing environment. The supersaturated air is constantly circulating so that heat is continuously removed from the bushing environment in this air and fresh supersaturated air continuously replaces the heated air removed.

BRIEF DESCRIPTION OF THE DRAWINGS

The method of the present invention will be more fully described with reference to the drawings in which:

FIG. 2 is an expanded front elevational view of the fiber forming region illustrating the positioning of the liquid sprays according to a first embodiment of the invention;

FIG. 3 is a side elevational view illustrating the positioning of the liquid sprays according to the first embodiment of the instant invention;

DETAILED DESCRIPTION OF THE DRAWINGS

Figure 1:
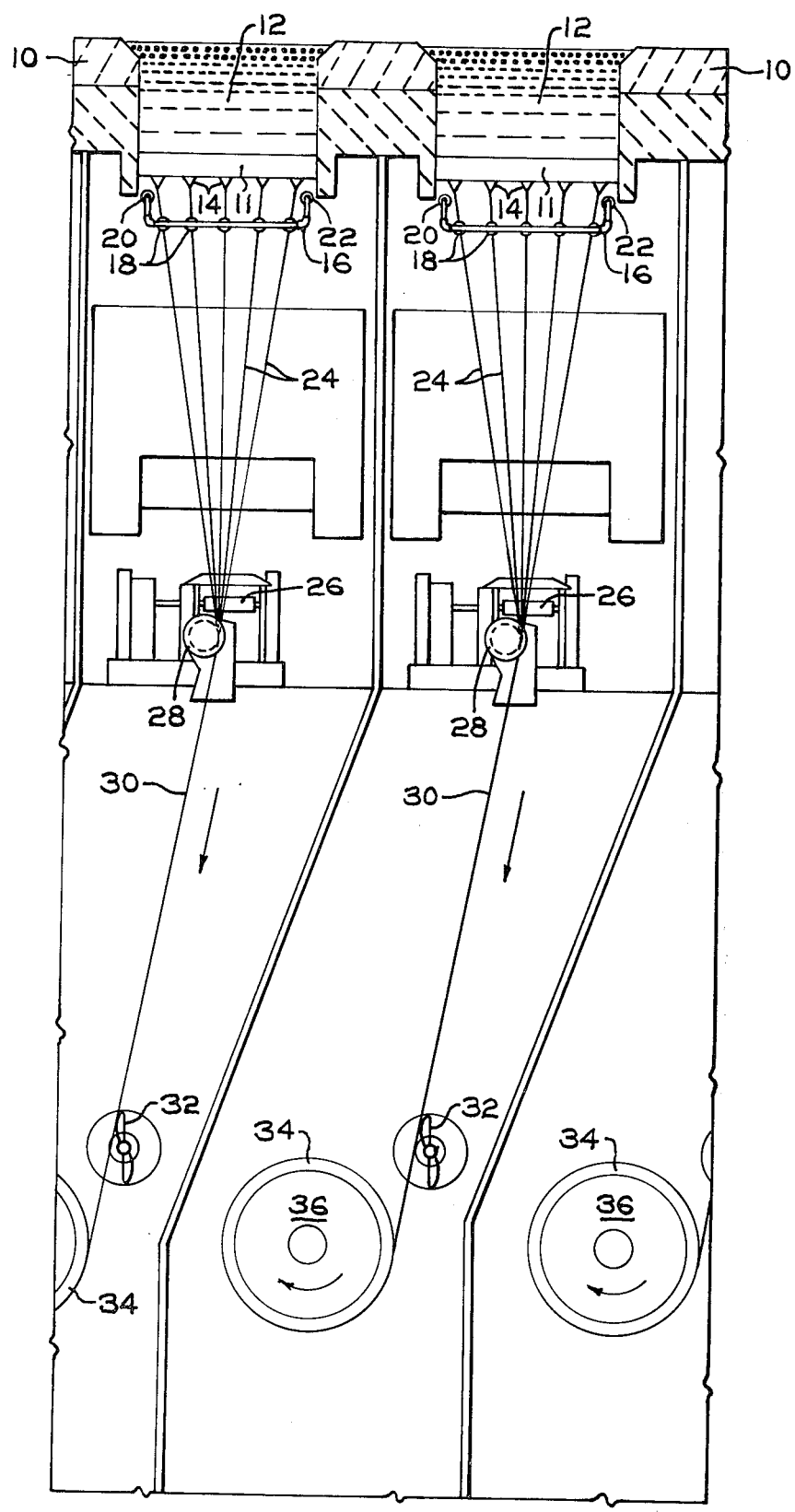
FIG. 1 is a diagrammatic front elevational view of a glass fiber forming operation in which the method of the present invention is employed.

Turning to FIG. 1, glass filaments 24 are attenuated through bushing tips 14 located at the bottom of a heated bushing 11 containing molten glass 12 within forehearth 10. The filaments 24, as they emerge from the bushing 11, are sprayed with water or another cooling liquid from spray nozzles 18. The operation of the spraying system will be more fully described below. The filaments 24 then pass across the application surface of an applicator 26, such as a belt applicator or roller applicator, as is known in the art, where the filaments 24 are coated with a binder and/or size. After coating, the filaments are passed within the groove of gathering shoe 28 where the filaments 24 are combined into a unified strand 30.

Strand 28 is then traversed across the face of a rotating spiral 32, which prevents the strand 30 from being wound in a parallel manner. Strand 30 is finally wound as a forming package 34 around rotating drum or collet 36.

As previously mentioned, the traverse 32 could be replaced by a traversing guide eye mechanism, in which case a generally diamond shaped pattern of strand wind will result.

Alternatively, the strand 30 and filaments 24 can be attenuated between a pair of wheels, belts, or a combination of wheels and belts and collected in a container to form a containerized package. In another alternative the strand 30 and filaments 24 may be attenuated and chopped between a pair of wheels, one of which included a plurality of cutting blades on its surface and the other of which has a resilient back-up surface, and collected in a container or chopped strand.

A first embodiment of the apparatus employed in the method of the present invention is illustrated in FIGS. 2 and 3. As is seen in these FIGURES, the bushing 11 includes a pair of terminals 38 and 42 on its two ends. These terminals 38 and 42 are connected respectively to terminal clamps 40 and 44, which are in turn connected to an electrical energy supply source (not shown). The bushing 11 is heated by means of electrical energy passing through it from terminals 38 and 42. As the filaments 24 emerge from the bushing 11, they are sprayed with water or another cooling liquid by means of spray nozzles 18. These nozzles 18 are supplied cooling fluid from header 16. Header 16 is vertically and horizontally adjustable to optimize the misting and cooling effect for various size and type bushings. Alternatively, each of the nozzles may be individually supplied with cooling liquid. In this case, the nozzles would be individually adjustable. Located on either side of the filament fan 24 are additional spray nozzles 20 and 22. In this embodiment, the spray nozzles 20 and 22 are vertically located above the nozzles 18 and horizontally closer to the filament fan 24 than the nozzles 18.

While the filaments 24 are cooled by their contact with the cooling liquid emerging from the nozzles 18, the liquid emerging from the nozzles 20 and 22 is employed to cool the sides of the terminal clamps 40 and 44 respectively and, as will be further described below, aid in controlling the environment below the bushing.

Figure 4:
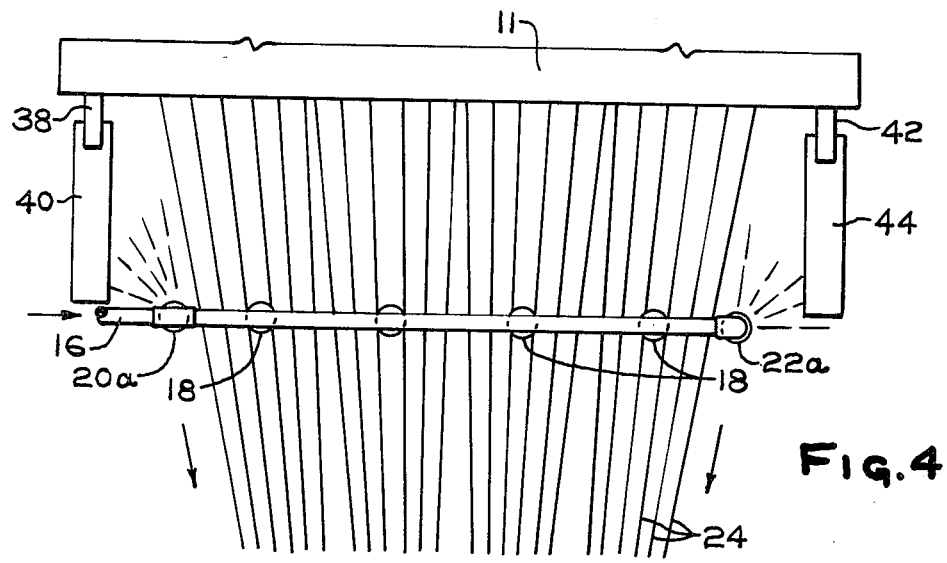
FIG. 4 is an expanded front elevational view illustrating the location of the liquid fluid sprays according to a second embodiment of the instant invention.

An alternative embodiment for the nozzles 18, 20 and 22 is shown in FIG. 4. In this embodiment, all of the nozzles 18, 20a and 22a are located in the same horizontal plane. Again, the filaments are cooled by their contact with the fluid flowing from nozzles 18 with the terminal clamps 40 and 44 being cooled by the liquid emerging from nozzles 20a and 22a respectively.

Similar to the embodiment shown in FIGS. 2 and 3, nozzles 20a and 22a may be somewhat closer to the vertical plane of the filament fan 24, however, this is not required. Thus, all of the nozzles 18, 20a and 22a could lie in the same horizontal and vertical planes. Also similar to the previous embodiment, header 16 is both horizontally and vertically adjustable to maximize the cooling and misting effects.

Figure 5:
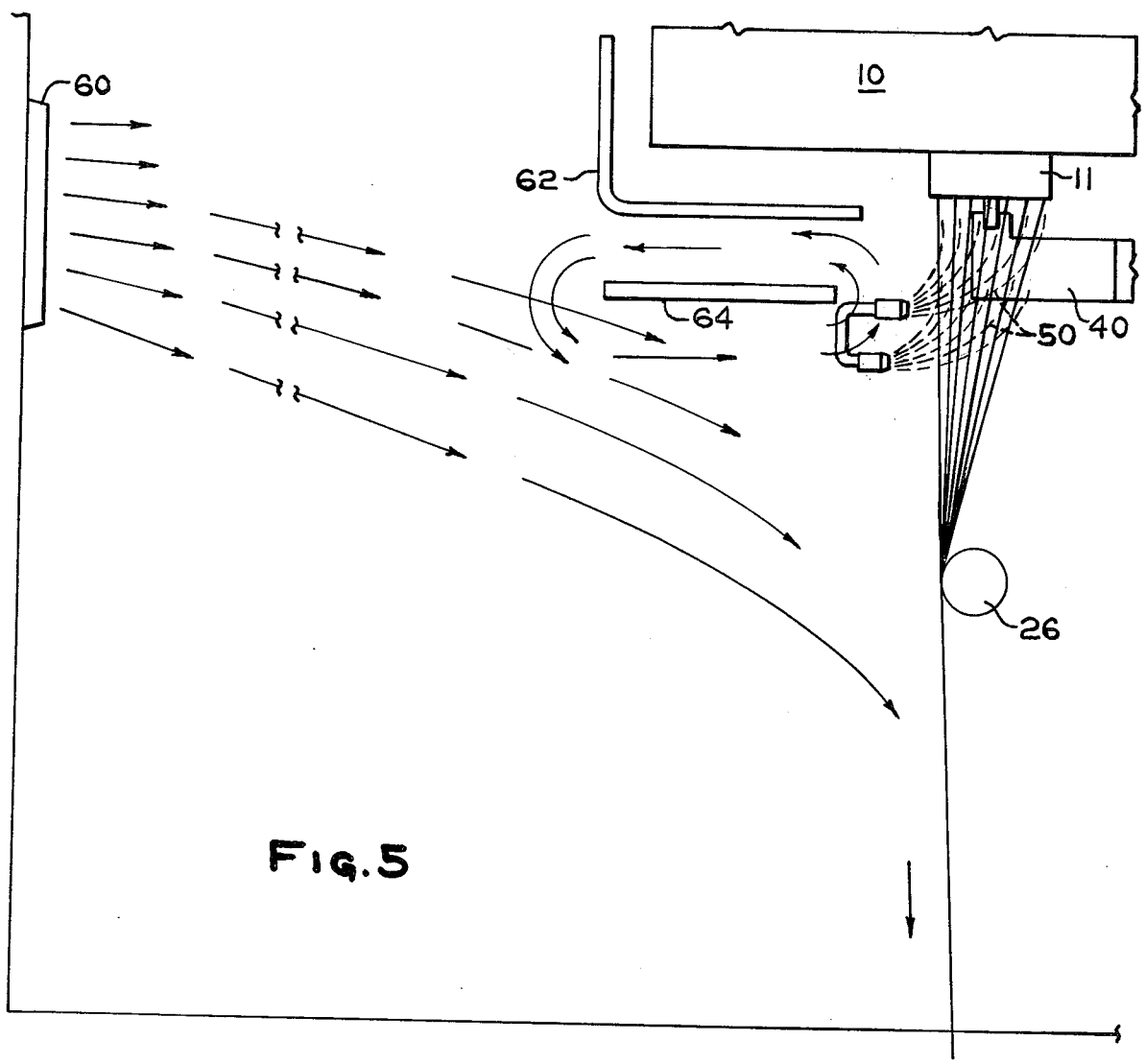
FIG. 5 is a diagrammatic side elevational view illustrating the gaseous and liquid fluid flow patterns associated with the employment of the instant invention.

The method of the instant invention is best seen in operation in FIG. 5. In this FIGURE, a diagrammatic right side elevational view of a forming position, including the air and liquid fluid currents present in the forming level, is illustrated. The forehearth 10 and bushing 11 are shown with a pair of cooling panels 62 and 64 located in front of the bushing 11. Cooling panel 62 extends upwardly to shield the operator from the front of the forehearth 10. Cooling panels 62 and 64 also provide some of the cooling for the region below the bushing 11 and help shield the operator of the forming position from the heat in the forming region. Cooling panel 62 may be located, for example, from about 1 to about 3 inches (2.54 to 7.62 centimeters) below the forehearth 10, and from about 4 to about 10 inches (10.16 to 25.40 centimeters) in front of the bushing 11, depending upon the type of bushing being employed. Cooling panel 64 may be located from about 1 to about 4 inches (2.54 to 10.16 centimeters) below cooling panel 62 and from about 8 to about 16 inches (20.32 to 30.64 centimeters) in front of bushing 11. Nozzles 20 and 22, and nozzles 18 of a straight line nozzle system as in FIG. 4 may be employed and may be located from about 4 to about 12 inches (10.16 to 30.48 centimeters) below bushing 11 and from about 3 to about 10 inches (7.62 to 25.40 centimeters) in front of bushing 11. If the nozzles 18 are located below the nozzles 20 and 22, as in FIG. 2, these nozzles can be from about 1 to about 5 inches (2.54 to 12.70 centimeters) below the nozzles 20 and 22 and can be the same distance in front of the bushing 11 as the nozzles 20 and 22, or can be up to 4 inches (10.16 centimeters) closer to front of bushing 11 than nozzles 20 and 22.

The cooling air for the forming position is supplied from an air conditioning system (not shown) having duct 60 connected thereto. Fins located within duct 60 are adjusted to constantly direct a portion of the air in a horizontal direction across bushing 11 and a portion of the air in a generally horizontal, but somewhat downwardly inclined direction as shown in FIG. 5. These fins are adjusted until a vortex is created between panels 62 and 64 such that the airflow between panels 62 and 64 is in an outward direction from the bushing while the airflow below panel 64 is in an inward direction toward the bushing. Thus, for example, airflows of from 200 to about 400 feet per minute (60.96 to 121.92 meters per minute) toward the bushing are typically encountered below the panel 64 and airflows from about 50 to about 150 feet per minute (15.24 to 45.72 meters per minute) in an outward direction from the bushing are typically found between panels 62 and 64.

The vortex effect between panel 60 and 62 creates an upward flow of the air in the fiber forming region immediately below bushing 11 towards bushing 11. This is in contrast to the typically downward airflow normally encountered in glass fiber forming due to the inducement of air in a downward direction with the filament fan 24 caused by the high speed attenuation of the filaments.

The upward airflow toward bushing 11 carries with it a portion of spray 50 emanating from nozzles 18 and 22 continuously. This upward spray 50 creates a mist or fog in the fiber forming region immediately below bushing 11. Due to the intense heat at the bushing 11, the water or other cooling fluid is vaporized prior to its contacting the bushing 11, such that the bushing 11 remains dry.

The fog mist below bushing 11 performs two functions. First, it constantly cools the environment below the bushing 11 and helps maintain a more uniform temperature environment in this region. Second, this mist or fog creates a radiation shield and reduces substantially the amount of heat which is radiated from the bushing 11 and which reaches the operator of the forming position, thus greatly increasing the comfort of the operator in the forming position.

In addition to creating the fog mist, the cooling fluid spray may perform an additional cooling function. As can best be seen in FIGS. 2 and 4, nozzles 20 and 22 or 20a and 22a are not directed directly onto the filament fan as are nozzles 18. Rather, the nozzles 20 and 22 or 20a and 22a are positioned to direct the water or other cooling fluid along the sides of the filament fan 24 to cool the sides of the filament fan 24, and thus the sides of the fiber forming region below bushing 11, and against terminal clamps 40 and 44, respectively, to cool these elements and thus reduce the heat radiated from them toward the operator.

The mist is continuously removed from the bushing environment through the slot between panels 62 and 64 and replaced with fresh cooling fluid and air to provide continuous cooling to the environment below the bushing.

EXAMPLE

Employing apparatus as illustrated in FIGS. 1, 2 and 5, 2,000 K6.75 glass filaments were attenuated at a speed of 3,000 feet per minute (914.7 meters per minute). Conditioned air was supplied from duct 60 at a volume of approximately 1725 to 2070 cubic feet per minute (48.3 to 68.0 cubic meters per minute) and grill 60 was adjusted to give airflow between cooling panels 62 and 64 as illustrated in FIG. 5. Water was supplied from the nozzles 18, 20 and 22 at a rate of approximately 0.7 gallons per hour (2.65 liters per hour) per nozzle.

For a 60 day period, the job efficiency, which is measured as the percentage of acceptable quality material actually produced as compared to the theoretical amount of quality material which could be produced, was 84.87%, based upon computer estimates.

For comparison, the same forming position was operated without cooling panel 64 and without creating the fog or mist in the bushing region for a 60 day period. The average job efficiency was 61.98%, again based on computer estimates.

Clearly, therefore, by employing the system of the present invention improved glass fiber forming conditions are created.

From the foregoing, it is clear that the present invention provides an improved method and apparatus for forming glass fibers both from the aspects of operator comfort and quality fiber formation.

While the invention has been described with reference to certain specific embodiments thereof, it is not intended to be so limited thereby, except as set forth in the accompanying claims.

I claim:

1. In the method of forming continuous glass fibers comprising drawing filaments through a bushing, contacting the filaments with a liquid cooling fluid, gathering the filaments into a strand and collecting the strand the improvement comprising passing cooling air horizontally and downwardly toward the bushing, lifting a portion of the air in an area below the bushing upwardly toward the bushing at a velocity sufficient to entrap a portion of said cooling fluid to thereby create a supersaturated air atmosphere, establishing with the upwardly moving air a supersaturated air atmosphere immediately below the bushing, removing heat from the bushing environment with the supersaturated cooling air atmosphere, and removing and replacing the supersaturated air continously.

2. The method of claim 1 further comprising flowing liquid cooling fluid along the sides of the fiber forming region.

3. The method of claim 2 further comprising cooling terminal clamps connected to said bushing with said liquid cooling fluid flowing along the sides of the fiber forming region.

4. The method of claim 1 wherein said supersaturated air atmosphere forms a radiation shield to shield an operator of the fiber forming position from heat from the bushing region.

5. In the method of forming continuous glass fiber comprising drawing filaments through a bushing, contacting the filaments with a liquid cooling fluid, gathering the filaments into a strand and collecting the strand the improvement comprising passing cooling air in a generally horizontal direction toward the bushing, directing a portion of the said cooling air passing underneath the bushing upwardly toward the bushing at a velocity sufficient to entrap a portion of said cooling fluid and moving the portion of air with the cooling fluid entrapped therein upwardly toward and below the bushing thereby creating a supersaturated air atmosphere immediately below the bushing, removing heat from the bushing environment with the supersaturated cooling air atmosphere and removing and replacing the supersaturated air continuously.

6. The method of claim 5 further comprising flowing liquid cooling fluid along the sides of the fiber forming region.

7. The method of claim 6 further comprising cooling terminal clamps connected to said bushing with said liquid cooling fluid flowing along the sides of the fiber forming region.

8. The method of claim 5 wherein said supersaturated air atmosphere forms a radiation shield to shield an operator of the fiber forming position from heat from the bushing region.

9. The method of claim 1 wherein a said cooling fluid comprises water and said supersaturated air atmosphere comprises mist.

10. The method of claim 5 wherein said cooling fluid comprises water and said supersaturated air atmosphere comprises mist.

11. The method of claim 1 wherein the drawing of filaments is through the bushing tips of said bushing.

12. The method of claim 5 wherein the drawing of filaments is through the bushing tips of said bushing.

* * * * *

UNITED STATES PATENT AND TRADEMARK OFFICE
CERTIFICATE OF CORRECTION

PATENT NO. : 4,141,709
DATED : February 27, 1979
INVENTOR(S) : Walter J. Reese

It is certified that error appears in the above-identified patent and that said Letters Patent are hereby corrected as shown below:

Under References Cited, the following were omitted:

| | | | |
|---|---|---|---|
| 3,068,670 | 12/1962 | Russell | 64/12 |
| 3,304,163 | 2/1967 | Holschlag | 65/11 |
| 2,234,986 | 3/1941 | Slayter et al. | 65/2 |
| 3,865,565 | 2/1975 | Spence | 65/2 |
| 3,281,224 | 10/1966 | Lowe, Jr. | 65/11 |
| 3,988,135 | 10/1976 | Coggin, Jr. | 65/1 |
| 4,003,731 | 1/1977 | Thompson | 65/12 |
| 3,905,790 | 9/1975 | Strickladd | 65/2 |
| 3,969,099 | 7/1976 | Reese | 65/2 |
| 2,632,287 | 3/1953 | Phillips | 65/12 |
| 3,347,648 | 10/1967 | Krakauer et al. | 65/3 |

Signed and Sealed this

Twenty-ninth Day of May 1979

[SEAL]

Attest:

RUTH C. MASON
Attesting Officer

DONALD W. BANNER
Commissioner of Patents and Trademarks